US 7,305,880 B2

(12) United States Patent
Caminada et al.

(10) Patent No.: US 7,305,880 B2
(45) Date of Patent: *Dec. 11, 2007

(54) RESONANT MICRO-ELECTRO-MECHANICAL SYSTEM WITH ANALOG DRIVING

(75) Inventors: Carlo Caminada, Rho (IT); Ernesto Lasalandra, San Donato Milanese (IT); Luciano Prandi, Bellinzago Novarese (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 129 days.

This patent is subject to a terminal disclaimer.

(21) Appl. No.: 11/195,347

(22) Filed: Aug. 2, 2005

(65) Prior Publication Data

US 2006/0033588 A1    Feb. 16, 2006

(30) Foreign Application Priority Data

Aug. 3, 2004  (EP)  ................................. 04425599

(51) Int. Cl.
*G01P 15/00*     (2006.01)
*G01P 9/00*      (2006.01)

(52) U.S. Cl. ................................. 73/504.04; 73/504.12

(58) Field of Classification Search ............. 73/504.12, 73/504.13, 504.14, 504.15, 504.16, 514.32, 73/514.29, 514.36, 504.04, 504.02

See application file for complete search history.

(56) References Cited

U.S. PATENT DOCUMENTS 5,627,318 A    5/1997  Fujii et al. ............... 73/514.32
5,719,460 A    2/1998  Watarai et al. ............... 310/316
6,253,612 B1   7/2001  Lemkin et al. .......... 73/504.02
6,701,786 B2   3/2004  Hulsing, II ............... 73/514.02
6,766,689 B2   7/2004  Durante et al. .......... 73/504.04
6,823,733 B2*  11/2004 Ichinose ................... 73/504.02
6,934,665 B2*  8/2005  Rober ........................ 702/189
2001/0037683 A1  11/2001 Nozoe et al. ............. 73/504.16
2002/0178813 A1  12/2002 Babala ................... 703/504.12
2002/0189354 A1  12/2002 Durante et al. .......... 73/504.12
2006/0032309 A1*  2/2006 Caminada et al. ....... 73/514.18

FOREIGN PATENT DOCUMENTS

| EP | 1 253 399 A1 | 10/2002 |
| EP | 1 296 114 A1 | 3/2003 |
| EP | 1 359 391 A2 | 11/2003 |
| WO | WO 99/14557 | 3/1999 |
| WO | WO 2004/046650 A1 | 6/2004 |

\* cited by examiner

*Primary Examiner*—Helen Kwok
(74) *Attorney, Agent, or Firm*—Lisa K. Jorgenson; Timothy L. Boller; Seed IP Law Group PLLC

(57) ABSTRACT

A resonant micro-electro-mechanical system includes a microstructure having a mass which is free to oscillate in accordance with a predetermined degree of freedom, and a driving device coupled to the mass for maintaining the mass in oscillation at a resonance frequency. The driving device includes a differential sense amplifier supplying first signals indicative of a velocity of oscillation of the mass, and an actuation and control stage supplying second signals for driving the mass on the basis of the first signals. The driving device moreover includes a filtering circuit of a high-pass type, which is connected between the differential sense amplifier and the actuation and control stage, and has a bandpass that includes the resonance frequency.

25 Claims, 8 Drawing Sheets

RESONANT MICRO-ELECTRO-MECHANICAL SYSTEM WITH ANALOG DRIVING

BACKGROUND OF THE INVENTION

1. Field of the Invention

The present invention relates to a resonant micro-electro-mechanical system with analog driving.

2. Description of the Related Art

As is known, the use of micro-electro-mechanical systems, or MEMS, is increasingly widespread in various sectors of technology and has yielded encouraging results especially in the construction of inertial sensors, micro-integrated gyroscopes, and electromechanical oscillators for a wide range of applications.

MEMS systems of this type are usually based upon micro-electro-mechanical structures comprising at least one mass, which is connected to a fixed body (stator) by means of springs and is movable with respect to the stator according to predetermined degrees of freedom. The movable mass and the stator are capacitively coupled by a plurality of respective comb-fingered and mutually facing electrodes, so as to form capacitors. The movement of the movable mass with respect to the stator, for example on account of an external stress, modifies the capacitance of the capacitors; from this it is possible to trace back to the relative displacement of the movable mass with respect to the fixed body and hence to the applied force. Instead, by supplying appropriate biasing voltages, it is possible to apply an electrostatic force to the movable mass to set it in motion. Furthermore, to obtain electromechanical oscillators the frequency response of the inertial MEMS structures is exploited, which is typically of a second order low-pass type. By way of example, FIGS. 1 and 2 show the curve of the magnitude and of the phase of the transfer function between the force applied to the movable mass and its displacement with respect to the stator, in an inertial MEMS structure.

Many MEMS systems (in particular, all electromechanical oscillators and gyroscopes) must envisage driving devices that have the task of maintaining the movable mass in oscillation.

A first known type of solution envisages supplying, in open loop, periodic stresses on the resonance frequency of the MEMS structure. The solution is simple, but also far from effective because the resonance frequency is not known with precision on account of the uneliminable dispersions in the processes of micromachining of semiconductors. Furthermore, the resonance frequency of each individual device can vary over time, for example on account of temperature gradients or, more simply, on account of ageing.

Then, feedback driving circuits have been proposed, which are based upon the use of sigma-delta modulators. Circuits of this type are undoubtedly more effective than the previous ones in stabilizing oscillation of the movable mass at the real resonance frequency and in suppressing any disturbance. However, different stages are necessary for filtering, decimating and further processing the bitstream supplied by the sigma-delta modulator. For this reason, currently available feedback driving circuits are complex to produce, cumbersome and, in practice, costly.

BRIEF SUMMARY OF THE INVENTION

According to one embodiment of the present invention, a resonant micro-electro-mechanical system includes a microstructure having a first mass constrained to oscillate along a first axis (e.g., an X axis) and a second mass constrained to oscillate along the first axis and a second axis (e.g. a Y axis), where the second mass is mechanically coupled to the first mass. The system includes an analog driving device coupled to the first mass in a feedback loop for maintaining the first mass in oscillation at a resonance frequency, and an analog reading device coupled to the second mass for detecting motion of the second mass along the second axis.

In one embodiment, the analog driving device further comprises a differential sense amplifier electrically coupled to the first mass for receiving first signals indicative of a velocity of the first mass and generating second signals indicative of the velocity of the first mass, a high-pass filtering means coupled to the differential sense amplifier for filtering the second signals, and an actuation and control stage coupled to the high-pass filtering means and the first mass for generating driving feedback signals based upon the second signals and supplying the driving feedback signals to the first mass to maintain the first mass in oscillation at the resonance frequency. In one embodiment, the actuation and control stage includes a variable-gain amplifier and a controller for controlling a gain of the variable-gain amplifier so that the first feedback loop has unit gain.

According to another embodiment, the analog reading device includes a charge amplifier electrically coupled to the second mass for receiving first signals indicative of a velocity of the second mass along the second axis and generating second signals indicative of a displacement of the second mass from a rest position along the second axis, a low-pass filtering means electrically coupled to the charge amplifier and the second mass for filtering the second signals to generate a raw signal, and a demodulation stage coupled to the low-pass filtering means for receiving the raw signal and generating an output signal indicative of an instantaneous angular velocity of the microstructure.

According to another embodiment of the present invention, a method for driving a resonant micro-electro-mechanical system comprises the steps of receiving reading currents indicative of an oscillation velocity of a driving mass constrained to move along a first axis, processing the reading currents via analog processing means to generate driving signals, and applying the driving signals to the driving mass to maintain the driving mass in oscillation along the first axis at a resonance frequency. The driving mass is coupled to a sensing mass and the sensing mass is configured to move along the first axis and a second axis.

According to one embodiment of the invention, the step of processing the reading currents further comprises the steps of converting the reading currents to reading voltages indicative of the oscillation velocity of the driving mass, filtering the reading voltages to eliminate offset voltages, generating a control voltage based upon the filtered reading voltages and a reference voltage, and amplifying the filtered reading voltages via a variable gain amplifier to generate the driving signals. The gain of the variable gain amplifier is based upon the control voltage.

BRIEF DESCRIPTION OF THE SEVERAL VIEWS OF THE DRAWINGS

For a better understanding of the invention, an embodiment thereof is now described, purely by way of non-limiting example and with reference to the attached drawings, in which.

DETAILED DESCRIPTION OF THE INVENTION

In the following description, reference will be made to the use of the invention in a micro-integrated gyroscope. This is not, however, to be considered in any way limiting, in so far as the invention can be exploited in all the cases where, in a micro-electro-mechanical structure, a movable mass must be excited and continuously maintained in oscillation at a natural resonance frequency. In particular, the invention can be advantageously applied to the construction of MEMS electromechanical oscillators.

Figure 1:
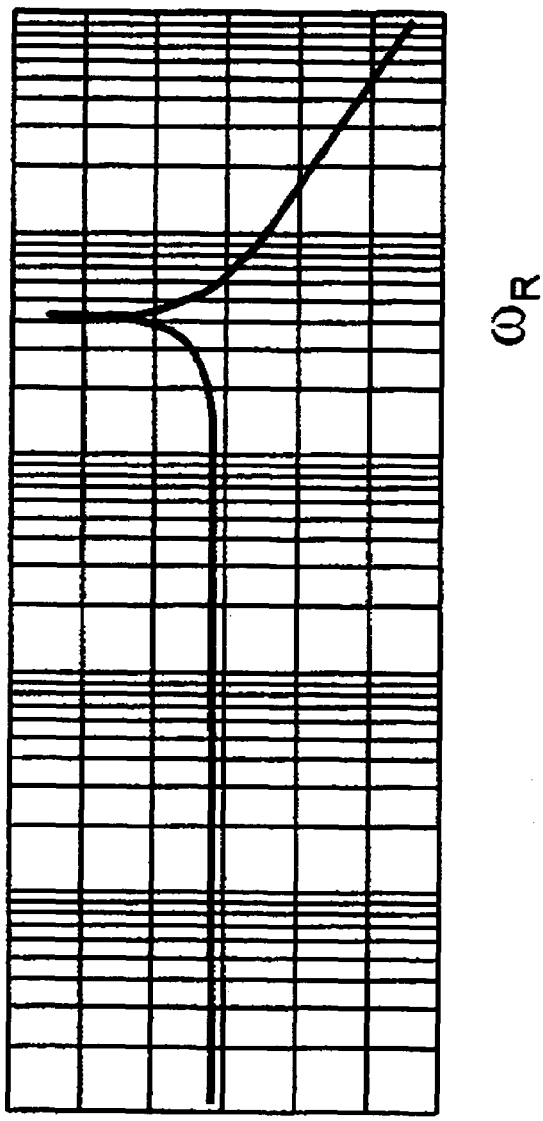
FIGS. 1 and 2 show graphs corresponding to the frequency response of a micro-electro-mechanical structure.
Figure 2:
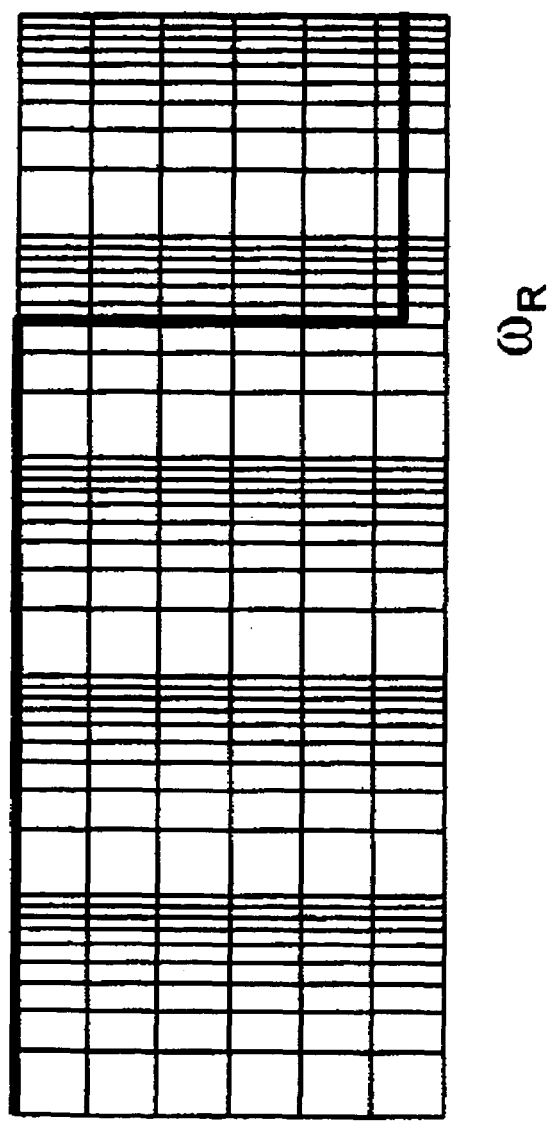
Figure 3:
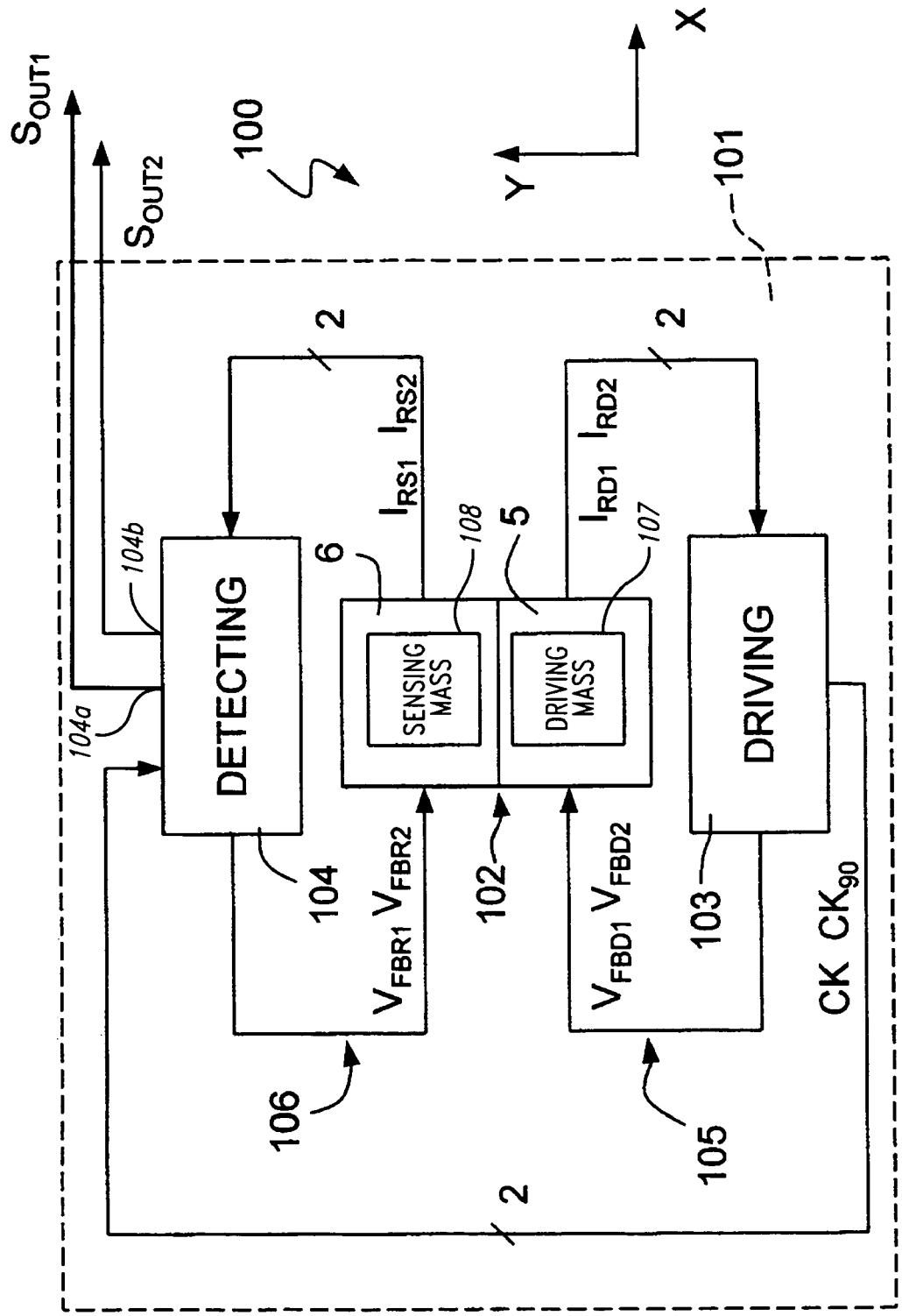
FIG. 3 is a simplified block diagram of a resonant micro-electro-mechanical system, according to one embodiment of the invention.

With reference to FIG. 3, a micro-integrated gyroscope 100 comprises a microstructure 102, made using MEMS technology, a driving device 103, and a reading device 104 (also referred to as a detecting device), housed on a support 101. The microstructure 102, which will be illustrated in detail hereinafter, is provided with an actuation system 5 and with an inertial sensor 6, which includes respective movable masses. More precisely, the actuation system 5 comprises a driving mass 107, oscillating about a rest position according to a degree of freedom of its own, in particular along a first axis X. The inertial sensor 6 has a detection axis directed according to a second axis Y, which is perpendicular to the first axis X, and comprises a sensing mass 108, mechanically connected to the driving mass 107 by springs (herein not illustrated) so as to be drawn in movement along the first axis X when the driving mass 107 is excited. Furthermore, the sensing mass 108 is relatively movable with respect to the driving mass 107 in the direction of the second axis Y and thus has a further degree of freedom.

The driving device 103 and the reading device 104 are connected to the microstructure 102 so as to form, respectively, a driving feedback loop 105, including the driving mass 107, and a reading feedback loop 106, including the sensing mass 108. Furthermore, the reading device 104 has a first output 104a and a second output 104b, which supply a first and, respectively, a second output signal $S_{OUT1}$, $S_{OUT2}$. In particular, the first output signal $S_{OUT1}$ is correlated to the acceleration to which the sensing mass 108 is subjected along the second axis Y; and the second output signal $S_{OUT2}$ is correlated to displacements of the sensing mass 108, once again in a direction of the second axis Y, on account of spurious drawing motions.

As is clarified in greater detail in the course of the ensuing description, the driving device 103 exploits the driving feedback loop 105 for maintaining the driving mass 107 in self-oscillation along the first axis X at its resonance frequency $\omega_R$ (for example, 4 kHz). Furthermore, the driving device 103 generates a first clock signal CK and a second clock signal $CK_{90}$, which is 90° out of phase, and supplies them to the reading device 104 for the purpose of synchronizing the operations of driving and reading of the microstructure 102.

The reading device 104 uses the reading feedback loop 106 to read the displacements of the sensing mass 108, which are determined by the resultant of the forces acting on the sensing mass 108 itself along the second axis Y. In practice, the sensing feedback loop 106 performs a force feedback for maintaining the sensing mass 108 in a rest position. The intensity of the electrostatic force to be applied is correlated to the displacement of the sensing mass 108 and hence to the forces acting thereon and can be estimated in a way in itself known, using the signals (voltages or currents) present in the sensing feedback loop 106.

The gyroscope 100 operates in the following way. The driving mass 107 is set in oscillation along the first axis X and draws along in movement in the same direction also the sensing mass 108. Consequently, when the microstructure 102 rotates about an axis perpendicular to the plane of the axes X, Y with a certain instantaneous angular velocity, the sensing mass 108 is subject to a Coriolis force, which is parallel to the second axis Y and is proportional to the instantaneous angular velocity of the microstructure 102 and to the linear velocity of the two masses 107, 108 along the first axis X. More precisely, the Coriolis force ($F_C$) is given by the equation:

$$F_C = 2M_S \Omega X'$$

where $M_S$ is the value of the sensing mass 108, $\Omega$ is the angular velocity of the microstructure 102, and X' is the linear velocity of the two masses 107, 108 along the first axis X.

In effect, also the driving mass 107 is subject to a Coriolis force; however, said force is countered by the constraints that impose on the driving mass 107 a movement exclusively along the first axis X.

The Coriolis force and acceleration to which the sensing mass 108 is subjected are measured by the inertial sensor 6. The response of the inertial sensor 6 can, however, contain also a component due to spurious drawing motions, which do not correspond to real rotations of the microstructure 102 and are caused by imperfections in the constraints of the driving mass 107 or in the mechanical coupling with the sensing mass 108.

In particular, the first output signal $S_{OUT1}$ is correlated to the Coriolis force (and to the Coriolis acceleration) and hence also to the instantaneous angular velocity of the microstructure 102; the second output signal $S_{OUT2}$ is, instead, correlated to the spurious motions of drawing. Furthermore, the first output signal $S_{OUT1}$ is modulated in amplitude proportionally to the Coriolis force and, consequently, to the instantaneous angular velocity of the microstructure 102, with the carrier centered at the resonance frequency $\omega_R$. The frequency band associated to the modulating quantity, i.e., the instantaneous angular velocity, is however, far lower than the resonance frequency $\omega_R$ (for example, 10 Hz).

Figure 4:
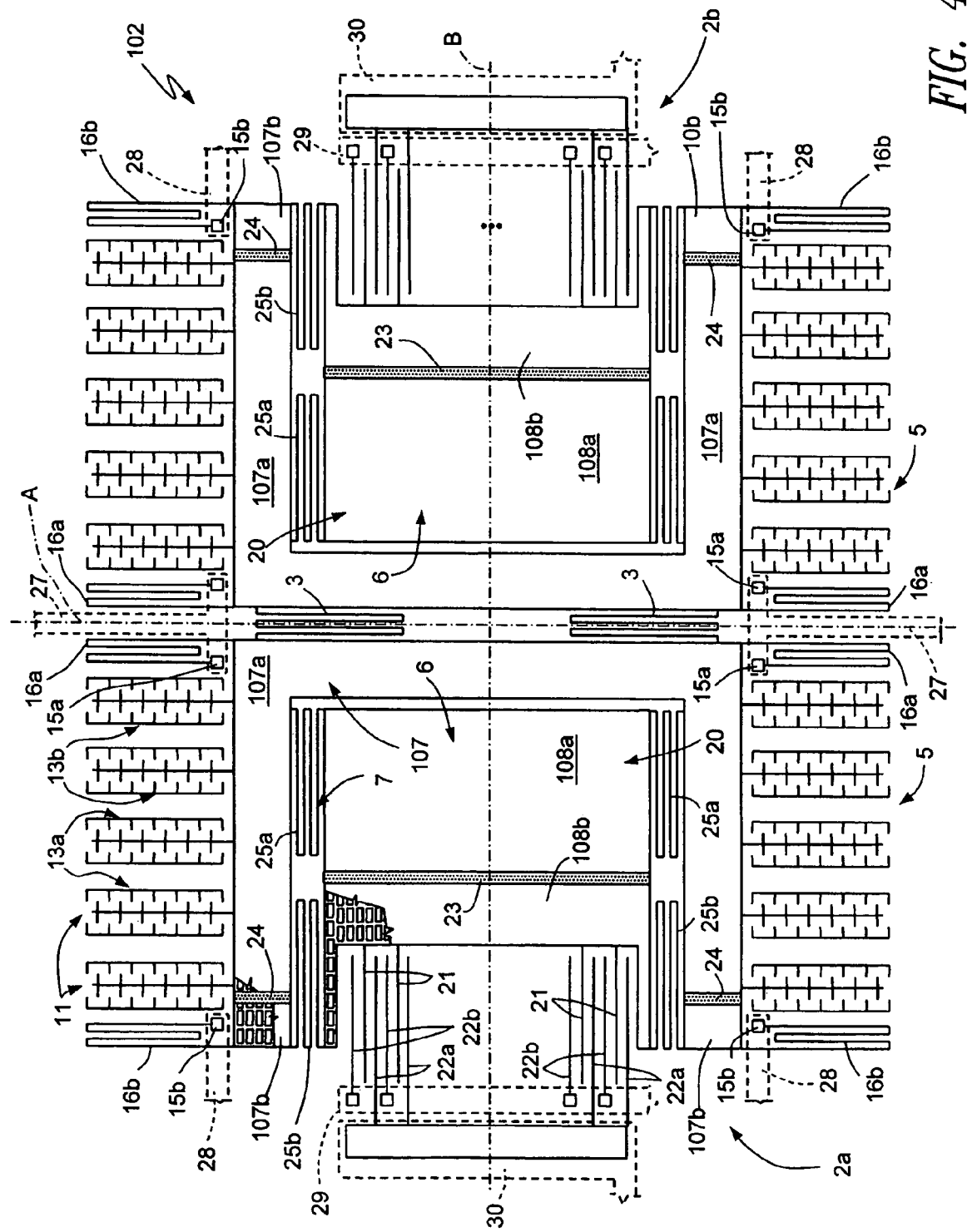
FIG. 4 is a plan view of a microstructure included in the system of FIG. 3, according to one embodiment of the invention.
Figure 4A:
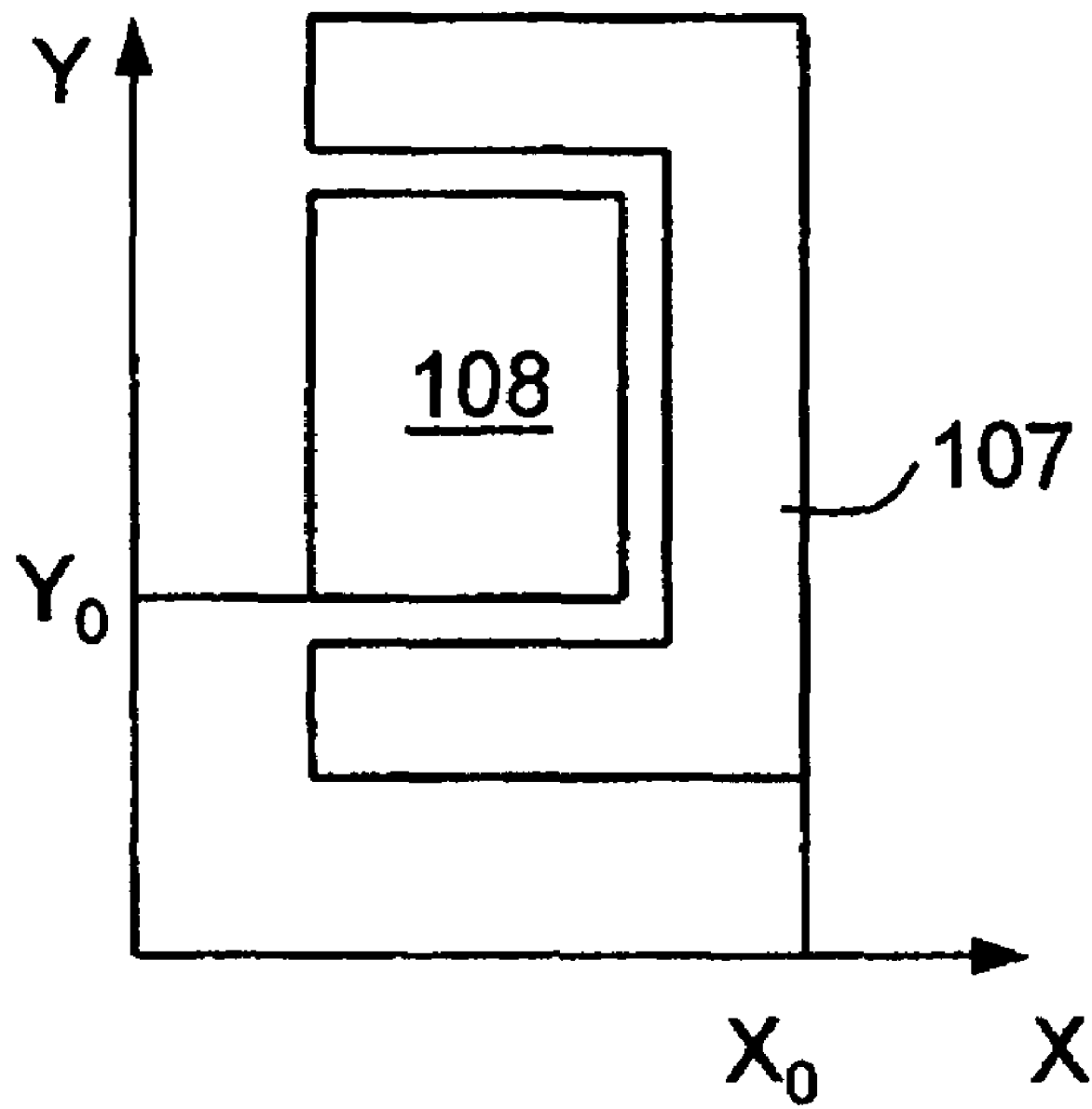
FIG. 4A is a simplified view of a part of the microstructure of FIG. 4, according to one embodiment of the invention.

FIG. 4 shows the complete layout of the microstructure 102, which is of the general type described in the European patent application No. EP-A-1 253 399. The microstructure 102 is made up of two parts 2a, 2b, which are symmetrical with respect to a central axis of symmetry designated by A (parallel to the second axis Y) and are connected together by two central springs 3, arranged symmetrically with respect to a barycentric axis designated by B and parallel to the first axis X. Designated by $X_0$ and $Y_0$ in FIG. 4a are a rest position of the driving mass 107 with respect to the first axis X and, respectively, a rest position of the sensing mass 108 with respect to the second axis Y.

Each part 2a, 2b comprises a respective actuation system 5, a respective inertial sensor 6, and a mechanical connection 7, which connects the actuation system 5 to the inertial sensor 6. In FIG. 3, the microstructure 102 has been represented schematically in a simplified way with reference to just one of the two parts 2a, 2b.

In detail, the actuation system 5 comprises the driving mass 107 having an open concave shape (C shape), movable actuation electrodes 11 connected to the driving mass 107, and first and second fixed actuation electrodes 13a, 13b comb-fingered to the movable actuation electrodes 11. The driving mass 107 is supported by first and second anchorages 15a, 15b via two first and two second anchoring springs 16a, 16b connected to the driving mass 107 in the proximity of the outer edges of the driving mass 107 itself.

The inertial sensor 6 comprises the sensing mass 108 and movable sensing electrodes 21 comb-fingered to first and second fixed sensing electrodes 22a, 22b. The sensing mass 108 is surrounded on three sides by the driving mass 107 and is supported thereby through two first coupling springs 25a and two second coupling springs 25b. The coupling springs 25a, 25b constitute the mechanical connection 7 and are connected to the sensing mass 108 in the proximity of the edges thereof. The movable sensing electrodes 21 extend from the sensing mass 108 from the side thereof not facing the driving mass 107.

The sensing mass 108 is divided into a first part 108a and a second part 108b by a first insulating region 23; likewise, the driving mass 107 is divided into a main portion 107a and two end portions 107b by two second insulating regions 24.

In detail, the first insulating region 23 extends approximately parallel to the central axis of symmetry A so that the first part 108a of the sensing mass 108 is supported and connected to the driving mass 107 only via the first coupling springs 25a, whilst the second part 108b of the sensing mass 108 is supported and connected to the driving mass 107 only via the second coupling springs 25b.

Furthermore, the second insulating regions 24 extend transversely to the respective C-shaped arms so that the main portion 107a of the driving mass 107 is connected only to the first coupling springs 25a and to the first anchoring springs 16a, whilst the end parts 107b of the driving mass 107 is connected only to the second coupling springs 25b and to the second anchoring springs 16b. The position of the second insulating regions 24 is moreover such that the movable actuation electrodes 11 extend from the main portion 107a of the driving mass 107 and are electrically connected thereto.

Actuation biasing regions 27, of a buried type, are connected to the first anchoring regions 15a; first detection biasing regions 28, which are also of a buried type, are connected to the second anchoring regions 15b; second detection biasing regions 29 are connected to the first fixed sensing electrodes 22a; and third detection biasing regions 30 are connected to the second fixed sensing electrodes 22b.

In this way, the first part 108a of the sensing mass 108, the first coupling springs 25a, the main portion 107a of the driving mass 107, the movable actuation electrodes 11, the first anchoring springs 16a, and the first anchoring regions 15a are all biased at the same potential, which is applied via the actuation biasing regions 27, and are electrically insulated, via the insulating regions 23, 24, from the rest of the suspended structures, which include the second part 108b of the sensing mass 108, the second coupling springs 25b, the end portions 107b of the driving mass 107, the second anchoring springs 16b, and the second anchoring regions 15b, biased via the first detection biasing regions 28.

Figure 5:
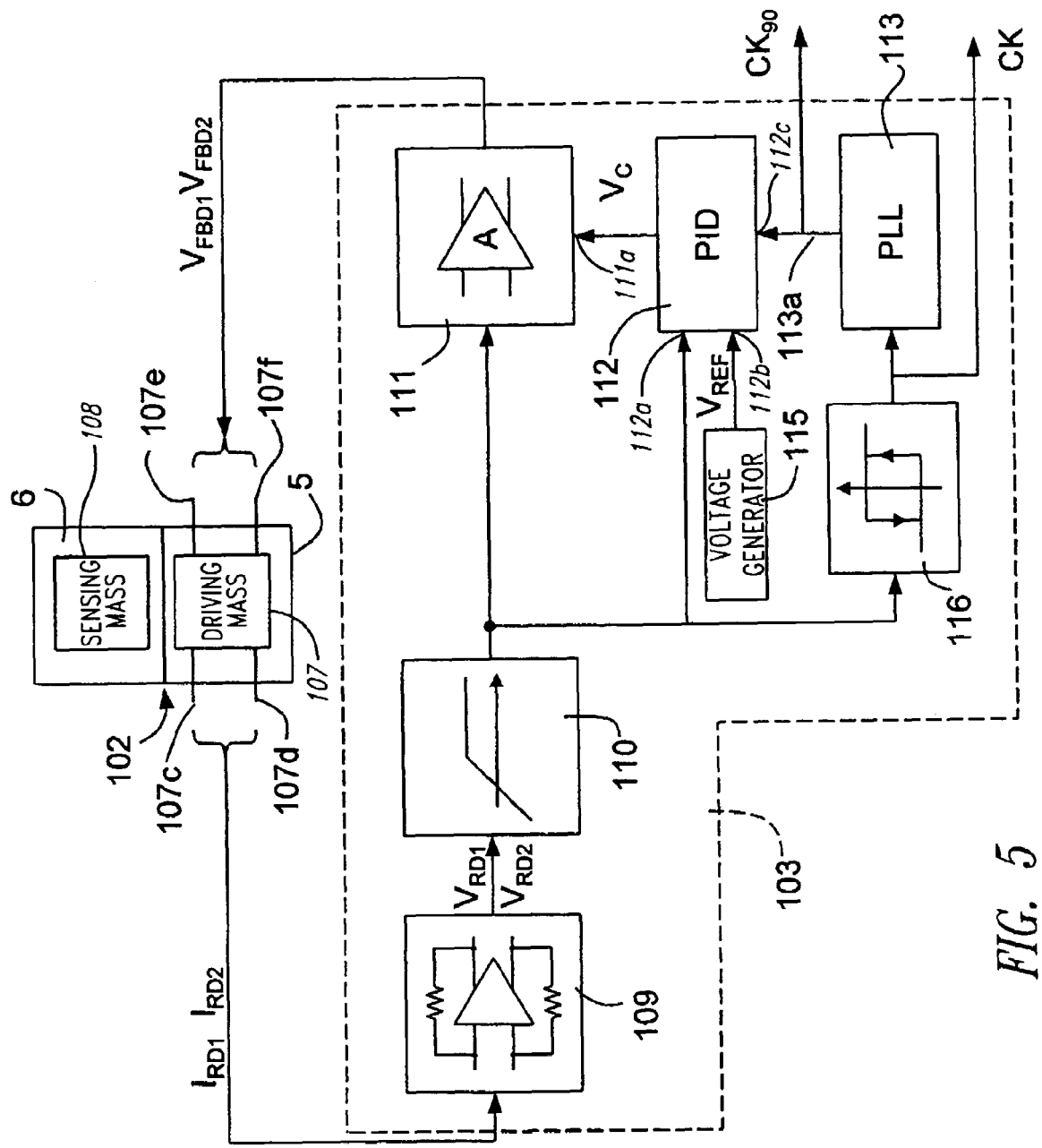
FIG. 5 is a block diagram of a driving device coupled to the microstructure of the micro-electro-mechanical system of FIG. 3, made according to the present invention.

With reference to FIG. 5, the driving device 103 comprises a transimpedence amplifier 109, a differentiator stage 110, a variable-gain amplifier (VGA) circuit 111, a controller 112, and a phase-locked-loop (PLL) circuit 113.

The transimpedence amplifier 109 is of a fully differential type and has a pair of inputs connected to reading outputs 107c, 107d of the actuation system 5 for receiving first reading currents $I_{RD1}$, $I_{RD2}$, which are correlated to the linear velocity of oscillation of the driving mass 107 along the first axis X. On the outputs of the transimpedence amplifier 109 there are hence first reading voltages $V_{RD1}$, $V_{RD2}$, which also indicate the linear velocity of oscillation of the driving mass 107 along the first axis X. Also the first reading voltages $V_{RD1}$, $V_{RD2}$ have equal amplitude and frequency and are out of phase by 180°.

Figure 6:
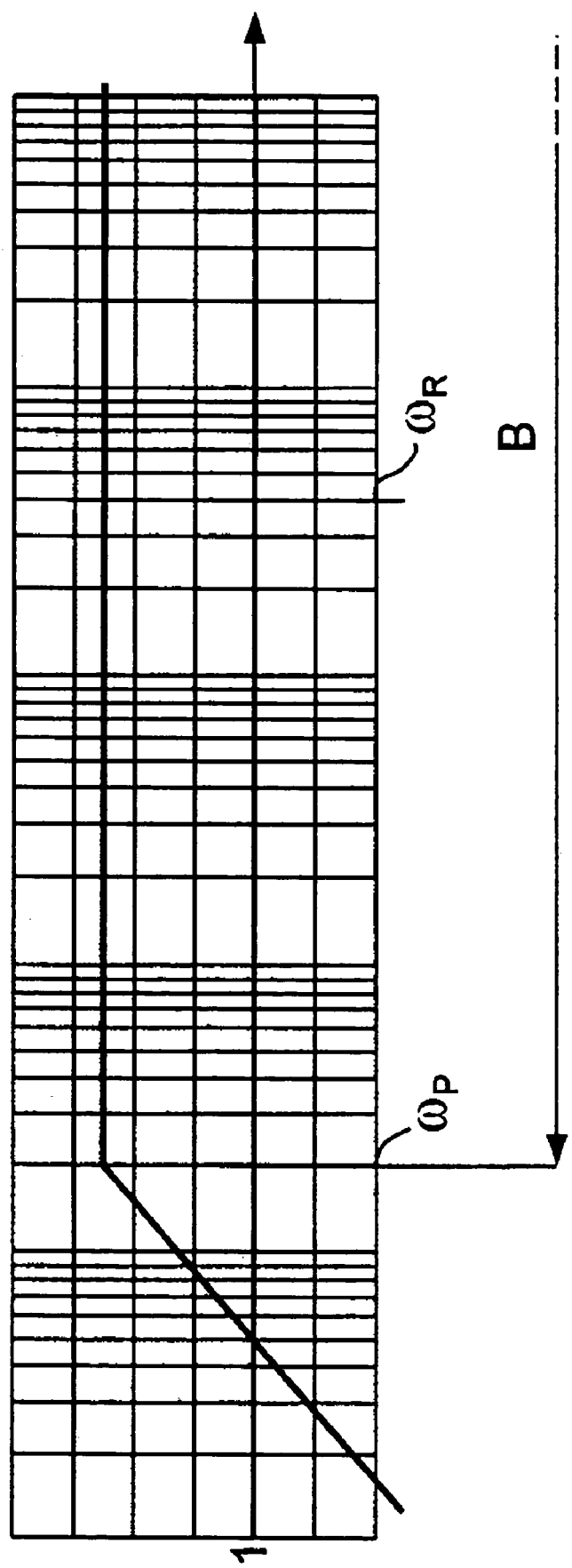
FIG. 6 is a graph corresponding to the frequency response of an element of the block diagram of FIG. 5, according to one embodiment of the invention.

The differentiator stage 110 is cascaded to the transimpedence amplifier 109. The transfer function of the differentiator stage 110, which is of a high-pass type and has a zero at zero frequency and a pole at a frequency $\omega_P$ smaller than the resonance frequency $\omega_R$ of the microstructure 102, is of the type:

$$T(s) = K\frac{s}{1+sT_P}$$

where s is a complex variable, K is a constant coefficient, and $T_P = 1/\omega_P$ is the time constant associated to the pole of the differentiator stage 110 (see also FIG. 6). Preferably, the coefficient K is such that, for frequencies greater than the frequency $\omega_P$ of the pole, the gain $K/T_P$ of the differentiator stage 110 is greater than unity. In practice then, the differentiator stage 110 amplifies the harmonic components of the first reading voltages $V_{RD1}$, $V_{RD2}$ close to the resonance frequency $\omega_R$, whilst possible constant components are eliminated (for example offset voltages). Furthermore, in the bandpass B of the differentiator 110, i.e., for frequencies greater than the frequency $\omega_P$ of the pole, the offset introduced by the differentiator stage 110 is substantially zero, since the contributions of the pole and of the zero are compensated.

The VGA circuit 111 is connected between the differentiator stage 110 and actuation inputs 107e, 107f of the driving mass 107 and supplies driving feedback voltages $V_{FBD1}$, $V_{FBD2}$ having amplitude and phase such as to maintain the driving mass 107 in oscillation at the resonance frequency $\omega_R$. In particular, the amplitude of the driving feedback voltages $V_{FBD1}$, $V_{FBD2}$ depends upon the gain of the VGA circuit 111, which is determined by the controller 112 so that the global gain of the driving feedback loop 105 is a unit gain.

The controller 112 is preferably of a switched-capacitor PID type and has first inputs 112a connected to the outputs of the differentiator stage 110, for receiving the first reading voltages $V_{RD1}$, $V_{RD2}$, amplified and depurated of the continuous component. A second input 112b of the controller 112 is connected to a voltage generator 115, supplying a reference voltage $V_{REF}$. The controller 112 moreover has an output, which is connected to a control input 111a of the VGA circuit 111 and supplies a control voltage $V_C$. In practice, the controller 112 generates the control voltage $V_C$ on the basis of the difference between the voltages on the first inputs 112a and the reference voltage $V_{REF}$. Preferably, the gain of the VGA circuit 111 depends linearly upon the control voltage $V_C$.

Figure 7:
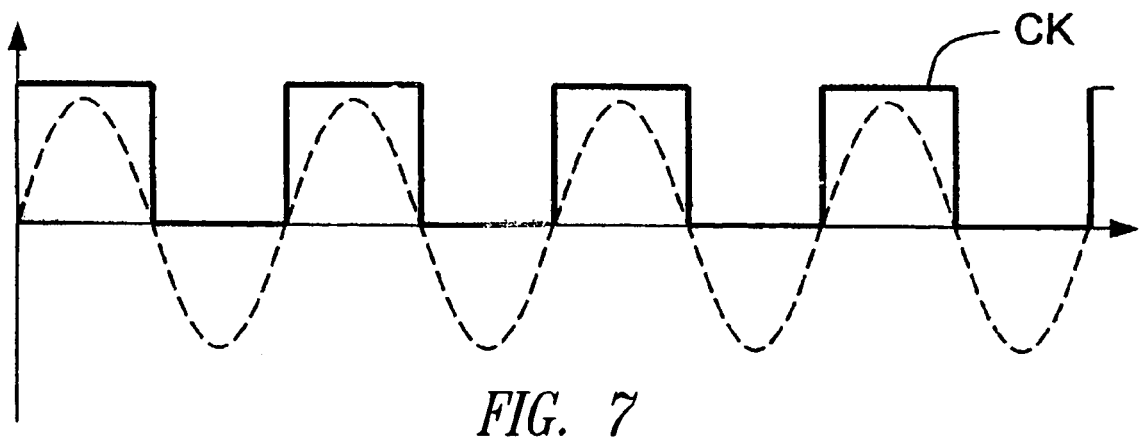
FIGS. 7-9 are graphs illustrating plots of quantities relating to the micro-electro-mechanical system of FIG. 3, according to one embodiment of the invention.
Figure 8:
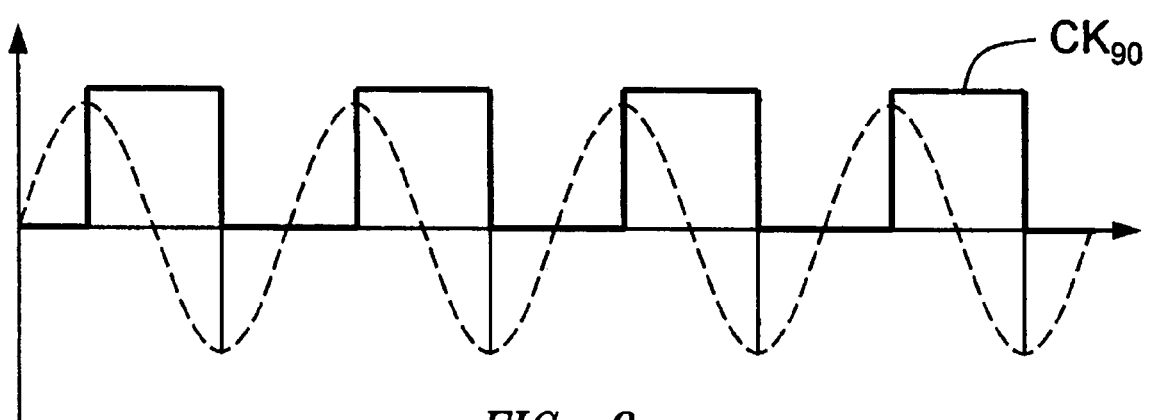

The PLL circuit 113 has inputs connected to the outputs of the differentiator stage 110 through a comparator 116, of an analog type with hysteresis, and an output 113a, connected to a clock input 112c of the controller 112. The comparator 116 supplies at output to the PLL circuit 113, the first clock signal CK, which is a square-wave voltage having a first value in a first half-period, in which the voltages on the outputs of the differentiator stage 110 have a respective sign, and a second value in a second half-period, in which the voltages on the outputs of the differentiator stage 110 have a sign opposite to that of the first half-period. In practice, the first clock signal switches at each change of sign of the first reading voltages $V_{RD1}$, $V_{RD2}$, which are in phase with the voltages on the outputs of the differentiator 110. Hysteresis prevents repeated switchings due to noise in the proximity of the changes of sign of the voltages on the outputs of the differentiator stage 110. Moreover, the PLL circuit 113 supplies the second clock signal $CK_{90}$ on the output 113a. In particular (see FIGS. 7 and 8), the first clock signal CK has edges synchronized with instants of zero-crossing of the first reading voltages $V_{RD1}$, $V_{RD2}$ (one of which is represented with a dashed line). The second clock signal $CK_{90}$ is 90° out of phase with respect to the first clock signal CK and is in phase with the peak values of the first reading voltages $V_{RD1}$, $V_{RD2}$. In other words, the first clock signal CK and the second clock signal $CK_{90}$ are in phase, respectively, with the linear velocity and with the displacement of the driving mass 107 along the first axis X.

The output of the comparator 116 and the output 113a of the PLL circuit 113 are moreover connected to the reading device 104.

As previously mentioned, the driving device 103 operates on the overall gain and phase of the driving feedback loop 105 so as to maintain the driving mass 107 constantly in oscillation at the resonance frequency $\omega_R$. The controller 112 intervenes above all upon triggering of the oscillation by increasing the gain of the VGA circuit 111, which is then reduced so that the overall gain of the driving feedback loop 105 is substantially a unit gain. In the second place, the controller 112 prevents—following upon external stresses, such as shocks or vibrations—the oscillations of the microstructure 102 from degenerating into limit cycles. In the absence of the controller 112, in fact, the response of the microstructure 102 can depart from the linearity domain, and hence uncontrolled oscillating motions may be set up. The effect of the external stresses is, instead, limited by the controller 112, which temporarily reduces the gain of the VGA circuit 111. Finally, the action of the controller 112 enables compensation of variations with respect to the nominal value and possible drift of the resonance frequency $\omega_R$.

The controller 112 uses the second clock signal $CK_{90}$ for consistently sampling the voltages on the outputs of the differentiator stage 110, always with the same phase. Preferably, the samples are taken at instants corresponding to edges of the second clock signal $CK_{90}$, i.e., to the peak values (see FIG. 8). As already explained, the synchronization of the second clock signal $CK_{90}$ is ensured by the PLL circuit 113.

Figure 9:
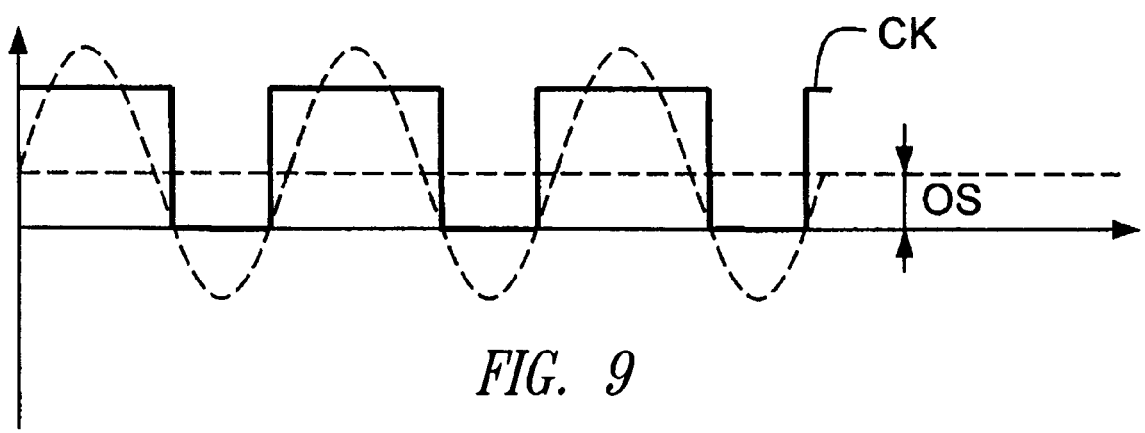

The differentiator stage 110 amplifies the first reading voltages $V_{RD1}$, $V_{RD2}$ and eliminates any possible intrinsic offset of the microstructure 102 or any offset introduced by the transimpedence amplifier 109. The elimination of the offset is particularly important for correct operation of the PLL circuit 113 and, consequently, of the controller 112. As illustrated in FIG. 9, when an offset OS is present, the first reading voltages $V_{RD1}$, $V_{RD2}$ do not change sign at each half-period, but at different instants. Consequently, the comparator 116 switches at instants in which the phase of the first reading voltages $V_{RD1}$, $V_{RD2}$ is not known and the phase-locking fails. Thus, the first and second clock signals CK, $CK_{90}$ do not contain useful information because their edges do not correspond to the changes of sign or to the peak values of the first reading voltages $V_{RD1}$, $V_{RD2}$. Instead, the differentiator stage 110 suppresses the offset, and hence the comparator 116 switches at significant instants for phase-locking. For this reason, the first and second clock signals CK, $CK_{90}$ are synchronized to the first reading voltages $V_{RD1}$, $V_{RD2}$ with zero and 90° phase lag, respectively. Also the controller 112, then, is correctly clocked. The use of the differentiator stage 110 is additionally advantageous because it enables amplification of the first reading voltages $V_{RD1}$, $V_{RD2}$ without introducing phase offsets around the resonance frequency $\omega_R$ of the microstructure 102.

On the whole, the structure of the driving device 103 is far simpler than devices that use sigma-delta converters. Nevertheless, the oscillation frequency control is in any case accurate and is capable of rapidly compensating for any possible external disturbance.

Figure 10:
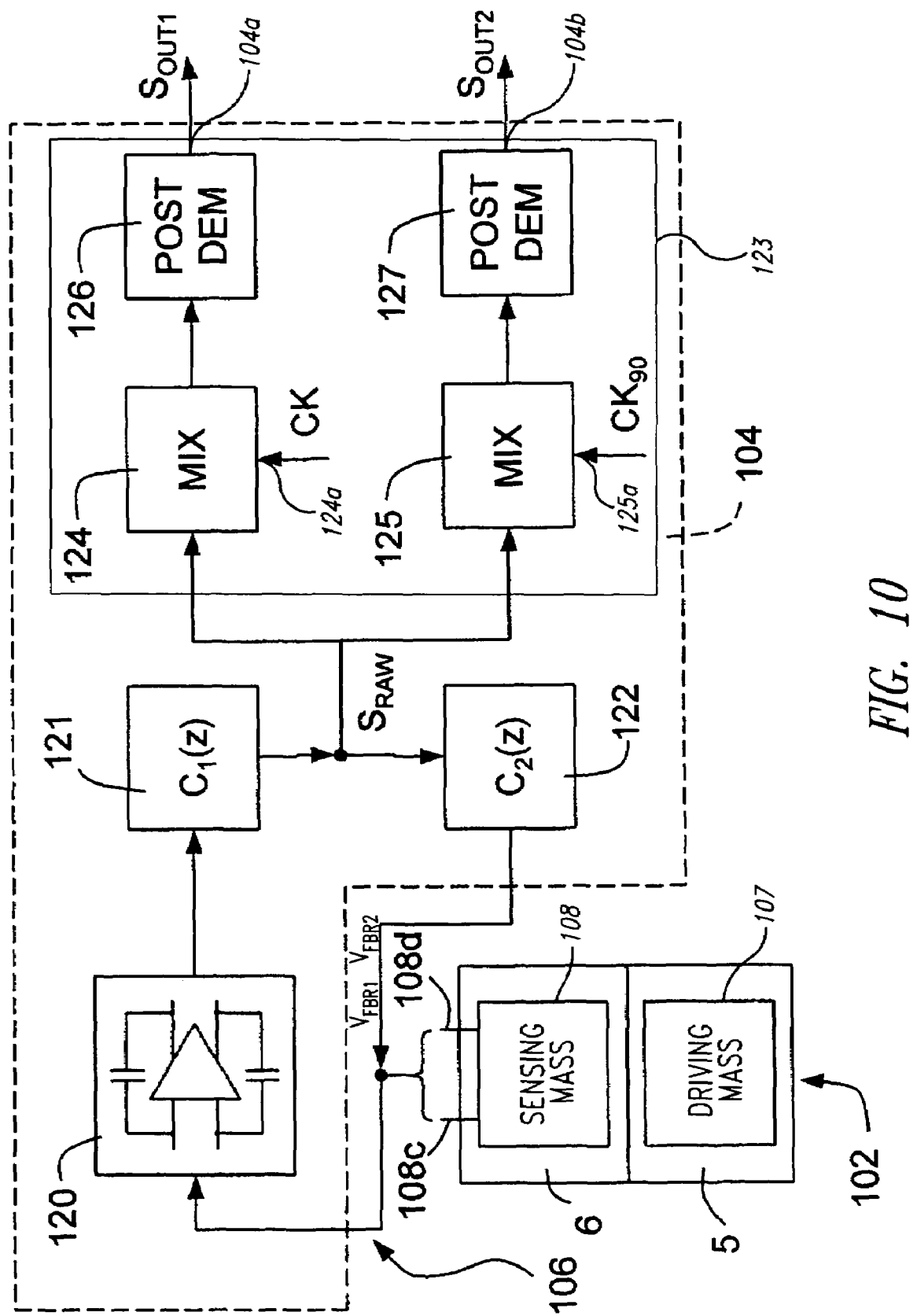
FIG. 10 is a block diagram of a reading device coupled to the microstructure of the micro-electro-mechanical system of FIG. 3, according to one embodiment of the invention.

With reference to FIG. 10, the reading device 104 comprises a charge amplifier 120, a first filter 121 and a second filter 122, which are included in the reading feedback loop 106, together with the sensing mass 108. Furthermore, the reading device 104 is provided with a demodulation stage 123, comprising a first demodulator 124 and a second demodulator 125 (mixers), with associated thereto respective post-demodulation filters 126, 127. All the components 120-127 that form the reading device 104 are of a discrete-time analog type and, in particular, are made up of fully differential switched-capacitor circuits. The electrical quantities used are then sampled, but not quantified. Thanks to the discrete-time operation, the reading device 104 can use a single pair of terminals 108c, 108d of the time-division sensing mass 108 both for reading, and for actuation.

The charge amplifier 120 has inputs connected to the terminals 108c, 108d of the sensing mass 108 for receiving second reading currents $I_{RS1}$, $I_{RS2}$, which are correlated to the linear velocity of oscillation of the sensing mass 108 along the second axis Y. On account of the charge amplification, on the outputs of the charge amplifier 120 there are second reading voltages $V_{RS1}$, $V_{RS2}$, indicative of the displacement of the sensing mass 108 along the second axis Y; also the second reading voltages $V_{RS1}$, $V_{RS2}$ have equal amplitude and frequency and are out of phase by 180° with respect to one another.

The first filter 121 and the second filter 122 are cascaded together, downstream of the charge amplifier 120. In greater detail, the first filter 121 has a transfer function $C_1(z)$ of a low-pass type and operates so as to obtain a stability condition on the magnitude of the gain of the reading feedback loop 106. On the outputs of the first filter 121 a raw signal $S_{RAW}$ is present, which is correlated both to the instantaneous angular velocity of the microstructure 102, and to the spurious drawing motions.

The second filter 122 has a transfer function $C_2(z)$ configured so as to recover the delays introduced by the first filter 121 and impose a stability condition on the phase of the gain of the reading feedback loop 106. Consequently, the transfer function $C_1(z)$ of the first filter 121 and the transfer function $C_2(z)$ of the second filter 122 ensure, in combination, the stability of the reading feedback loop 106. In practice, the second filter 122 operates by supplying to the terminals 108c, 108d of the sensing mass 108 reading feedback voltages $V_{FBR1}$, $V_{FBR2}$.

The demodulation stage 123 is connected to the output of the first filter 121 to receive the raw signal $S_{RAW}$, which is supplied to the demodulators 124, 125. Note that the point of the reading feedback loop 106 from which the raw signal $S_{RAW}$ is picked up is the most favorable one as regards the signal-to-noise ratio. The first demodulator 124 has a demodulation input 124a connected to the driving device 103 for receiving the first clock signal CK, and the second demodulator 125 has a demodulation input 125a connected to the driving device 103 for receiving the second clock signal $CK_{90}$. The outputs of the first and second post-demodulation filters 126,127 form the first output 104a and the second output 104b, respectively, of the reading device 104.

As previously mentioned, the sensing feedback loop 106 performs a negative force feedback on the sensing mass 108 of the inertial sensor 6. In response to a displacement of the sensing mass 108 along the second axis Y, the reading device 104, by means of the reading feedback voltages $V_{FBR1}$, $V_{FBR2}$, applies electrostatic forces tending to bring the sensing mass 108 itself back into its rest position $Y_0$.

The raw signal $S_{RAW}$ is generated in the sensing feedback loop 106 and is correlated to the displacements of the sensing mass 108 along the second axis Y. Furthermore, the raw signal $S_{RAW}$ is amplitude-modulated in DSB-SC (Double Side Band—Suppressed Carrier) mode and is thus the sum of two components. A first component, useful for measurement of the instantaneous angular velocity, is in phase with the displacement of the sensing mass 108 and has an amplitude correlated to the Coriolis acceleration (along the second axis Y) to which the sensing mass 108 itself is subject on account of the oscillation along the first axis X and of the rotation of the microstructure 102. A second component, 90° out of phase, is correlated to the spurious drawing motions. For example, if the driving mass 107 oscillates in a direction which is not perfectly aligned to the first axis X, the sensing mass 108 can be driven in oscillation along the second axis Y even in the absence of rotation of the microstructure 102.

Both of the contributions have the same carrier frequency, i.e., the resonance frequency $\omega_R$ of the driving mass 107, but are 90° out of phase with respect to one another. In particular, the first contribution is in phase with the first clock signal CK, whereas the second contribution is in phase with the second clock signal $CK_{90}$.

The first output signal $S_{OUT1}$ and the second output signal $S_{OUT2}$ are generated using, respectively, the first clock signal CK and the second clock signal $CK_{90}$ for demodulating the raw signal $S_{RAW}$. For this reason, the first output signal $S_{OUT1}$ corresponds to the first contribution, and hence its amplitude is correlated to the instantaneous angular velocity of the microstructure 102, and the second output signal $S_{OUT2}$ corresponds to the second contribution, and its amplitude is correlated to the amount of the spurious drawing motions.

The post-demodulation filters 126,127 eliminate the frequency components $2\omega_R$ from the first and second output signals $S_{OUT1}$, $S_{OUT2}$ after demodulation.

The reading device 104 is advantageous because it enables a precise reading of the displacements of the sensing mass 108 to be obtained, thanks to the force feedback, using only analog circuits. For this reason, the reading device 104 is far simpler to produce, as compared to traditional feedback loops based upon sigma-delta modulators.

The gyroscope 100 affords another advantage, which derives from the layout of the microstructure 102. Due to the location of the insulating regions 23, 24, in fact, the driving mass 107 and the sensing mass 108 can be biased independently of one another. In particular, it is possible to maintain the movable actuation electrodes 11 of the driving mass 107 connected to ground irrespective of the voltages that are supplied to the sensing mass 108 by the reading device 104 for exerting the force feedback.

Finally, it is evident that modifications and variations can be made to the resonant micro-electro-mechanical system described herein, without thereby departing from the scope of the present invention, as defined in the annexed claims.

In particular, the invention can be advantageously exploited for producing electromechanical oscillators of any type, as already mentioned previously. In addition, the reading device according to the invention can be used in gyroscopes having microstructures different from the ones described herein. For instance, the driving mass and the sensing mass could be in direct electrical connection with one another, without any insulating regions. In this case, however, it is preferable to associate to the transimpedance amplifier an offset-compensation stage. Alternatively, it is also possible to use a single mass with actuation and detection systems for two independent axes.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. A resonant micro-electro-mechanical system, comprising:
   a microstructure having a mass which is free to oscillate in accordance with a predetermined degree of freedom; and
   a driving device coupled to said mass for maintaining said mass in oscillation at a resonance frequency, said driving device including:
   a differential sense amplifier supplying first signals indicative of a velocity of oscillation of said mass,
   an actuation and control stage supplying second signals for driving said mass on the basis of said first signals, and
   a filter, of a high-pass type, connected between said differential sense amplifier and said actuation and control stage and having a bandpass including said resonance frequency.

2. The micro-electro-mechanical system according to claim 1 wherein the filter is of a zero phase-lag type.

3. The micro-electro-mechanical system according to claim 1 wherein the filter has a gain greater than 1 in said bandpass.

4. The micro-electro-mechanical system according to claim 1 wherein the filter comprises a differentiator.

5. The micro-electro-mechanical system according to claim 1 wherein said differential sense amplifier and said actuation and control stage comprise components made up of switched-capacitor circuits.

6. The micro-electro-mechanical system according to claim 1 wherein said differential sense amplifier, the filter, and said actuation and control stage are connected so as to form an oscillating feedback loop, including said mass.

7. The micro-electro-mechanical system according to claim 6 wherein said actuation and control stage comprises a variable-gain amplifier and a controller for controlling a gain of said variable-gain amplifier so that said feedback loop has unit gain.

8. The micro-electro-mechanical system according to claim 7 wherein said driving device further comprises a synchronization circuit coupled to said controller for clocking said controller on the basis of said first signals.

9. The micro-electro-mechanical system according to claim 8 wherein said synchronization circuit comprises a PLL circuit.

10. The micro-electro-mechanical system according to claim 9 wherein said synchronization circuit further comprises a comparator having inputs connected to outputs of the filter and an output connected to said PLL circuit for supplying a first clock signal in the form of a square-wave voltage having a first value in a first half-period, in which voltages on said outputs of the filter have a respective sign, and a second value in a second half-period, in which said voltages on said outputs of the filter have a sign opposite to that of the first half-period.

11. The micro-electro-mechanical system according to claim 10 wherein said PLL circuit has an output connected to a clock input of said controller for supplying a second clock signal 90° out of phase with respect to said first clock signal.

12. An integrated micro-electro-mechanical gyroscope, comprising:
a microstructure having a first mass which is free to oscillate along a first axis;
a driving device coupled to said first mass for maintaining said first mass in oscillation at a resonance frequency, said driving device including:
a differential sense amplifier supplying first signals indicative of a velocity of oscillation of said first mass;
an actuation and control stage supplying second signals for driving said first mass on the basis of said first signals; and
a filter, of a high-pass type, connected between said differential sense amplifier and said actuation and control stage and having a bandpass including said resonance frequency; and
an inertial sensor mechanically coupled to said first mass so as to be fixedly drawn along by said first mass along said first axis and having an axis of detection perpendicular to said first axis.

13. The gyroscope according to claim 12 wherein said inertial sensor comprises:
a second mass which is relatively movable with respect to said first mass along said axis of detection and with respect to a rest position; and
a displacement detector configured to detect a displacement of said second mass along said axis of detection, and including a force feedback loop supplying electrostatic forces tending to return said second mass to said rest position in response to a displacement of said second mass along said axis of detection.

14. The gyroscope according to claim 13 wherein said force feedback loop is an analog force feedback loop.

15. The gyroscope according to claim 12 wherein said inertial sensor comprises a micro-electro-mechanical inertial sensor.

16. An integrated micro-electro-mechanical system, comprising:
a microstructure including a first mass constrained to oscillate along a first axis and a second mass constrained to oscillate along the first axis and a second axis, the second mass coupled to the first mass;
an analog driving device coupled to the first mass in a feedback loop for maintaining the first mass in oscillation at a resonance frequency and including:
a differential sense amplifier electrically coupled to the first mass, the differential sense amplifier adapted to receive first signals indicative of a velocity of the first mass and generate second signals indicative of the velocity of the first mass; and
a high-pass filter coupled to the differential sense amplifier and configured to filter the second signals, the high-pass filter having a bandpass that includes the resonance frequency; and
an analog reading device coupled to the second mass for detecting motion of the second mass along the second axis.

17. The system of claim 16, wherein the second mass is mechanically coupled to the first mass.

18. The system of claim 16, wherein the analog driving device further comprises
an actuation and control stage coupled to the high-pass filter and the first mass for generating driving signals based upon the filtered second signals and supplying the driving signals to the first mass to maintain the first mass in oscillation at the resonance frequency.

19. The system of claim 18, wherein the actuation and control stage comprises a variable-gain amplifier and a controller for controlling a gain of the variable-gain amplifier so that the feedback loop has unit gain.

20. The system of claim 16, wherein the analog reading device further comprises
a charge amplifier electrically coupled to the second mass, the charge amplifier adapted to receive first signals indicative of a velocity of the second mass along the second axis and generate second signals indicative of a displacement of the second mass from a rest position along the second axis;
a low-pass filter electrically coupled to the charge amplifier and the second mass for filtering the second signals to generate a raw signal; and
a demodulation stage coupled to the low-pass filter and configured to receive the raw signal and generate an output signal indicative of an instantaneous angular velocity of the microstructure.

21. A method for driving a resonant micro-electro-mechanical system, comprising the steps of:
receiving reading currents indicative of an oscillation velocity of a driving mass constrained to move along a first axis, the driving mass being coupled to a sensing mass and the sensing mass being configured to move along the first axis and a second axis;
convening the reading currents to reading voltages indicative of the oscillation velocity of the driving mass;
filtering the reading voltages to eliminate offset voltages;
generating a control voltage based upon the filtered reading voltages and a reference voltage; and
amplifying the filtered reading voltages via a variable gain amplifier to generate driving signals; and
applying the driving signals to the driving mass to maintain the driving mass in oscillation along the first axis at a resonance frequency.

22. The method of claim 21, wherein a gain of the variable gain amplifier is based upon the control voltage.

23. A system, comprising:
a microstructure having a mass which is free to oscillate in accordance with a degree of freedom; and
a driving means for maintaining the mass in oscillation at a resonance frequency, coupled to the mass and including:
means for supplying a velocity signal indicative of a velocity of oscillation of the mass;
means for supplying a driving signal for driving the mass; and
means for filtering the velocity signal coupled between the means for supplying the velocity signal and the means for supplying the driving signal.

24. The system of claim 23 wherein the means for filtering comprises a band-pass filter configured to pass the resonance frequency.

25. The system of claim 23 wherein the means for supplying a velocity signal comprises a differential sense amplifier.

* * * * *

UNITED STATES PATENT AND TRADEMARK OFFICE
CERTIFICATE OF CORRECTION

PATENT NO. : 7,305,880 B2
APPLICATION NO. : 11/195347
DATED : December 11, 2007
INVENTOR(S) : Carlo Caminada et al.

Page 1 of 1

It is certified that error appears in the above-identified patent and that said Letters Patent is hereby corrected as shown below:

<u>Column 12</u>
Line 58, "convening the reading currents to reading voltages" should read as
-- converting the reading currents to reading voltages --

Signed and Sealed this

Fourteenth Day of July, 2009

JOHN DOLL
*Acting Director of the United States Patent and Trademark Office*